United States Patent [19]

McTamaney et al.

[11] 4,408,943
[45] Oct. 11, 1983

[54] SHIP-TO-SHIP FLUID TRANSFER SYSTEM

[75] Inventors: Louis S. McTamaney, Cupertino; Frank P. Haley, Upland, both of Calif.

[73] Assignee: FMC Corporation, Chicago, Ill.

[21] Appl. No.: 238,772

[22] Filed: Feb. 27, 1981

[51] Int. Cl.$^3$ .............................................. B65G 67/60
[52] U.S. Cl. ................................. 414/138; 114/74 R; 244/135 A; 244/161; 141/387; 340/686
[58] Field of Search .............. 414/138, 139, 140, 137; 244/135 A, 161; 114/74 R; 141/279, 284, 387, 388; 340/686

[56] References Cited

U.S. PATENT DOCUMENTS

| | | | |
|---|---|---|---|
| 3,096,797 | 7/1963 | Bily | 414/139 X |
| 3,889,728 | 6/1975 | Riche | 141/387 |
| 3,917,196 | 11/1975 | Pond et al. | 244/135 A X |
| 4,084,247 | 4/1978 | Ball | 141/387 X |
| 4,158,885 | 6/1979 | Neuberger | 244/135 A X |
| 4,205,308 | 5/1980 | Haley et al. | 340/686 |

FOREIGN PATENT DOCUMENTS

| | | | |
|---|---|---|---|
| 2818569 | 10/1979 | Fed. Rep. of Germany | 414/139 |
| 846391 | 8/1960 | United Kingdom | 414/138 |
| 600025 | 4/1978 | U.S.S.R. | 414/138 |
| 761355 | 9/1980 | U.S.S.R. | 414/138 |

Primary Examiner—Robert J. Spar
Assistant Examiner—Ken Muncy
Attorney, Agent, or Firm—L. B. Guernsey; W. W. Ritt, Jr.; R. B. Megley

[57] ABSTRACT

A system for transferring fluid between two marine tankers, including a first articulated loading arm mounted on the first tanker and a second loading arm or other suitable receiver mounted on the second tanker. The first loading arm is guided into operating contact with the second arm or receiver by laser tracking and ranging equipment, and by a computer which computes the location of the end of the first loading arm relative to the second arm or receiver. After the first loading arm and the receiver are connected together, the computer calculates the position of the outboard end of the first loading arm, compares this position to a set of safe operating boundaries, and provides a warning signal whenever the end of the arm moves outside any of these safe boundaries. When the end of the first arm moves outside a critical boundary the computer provides a disconnect signal which shuts down the loading operation and disconnects the first loading arm from the second arm or receiver.

10 Claims, 9 Drawing Figures

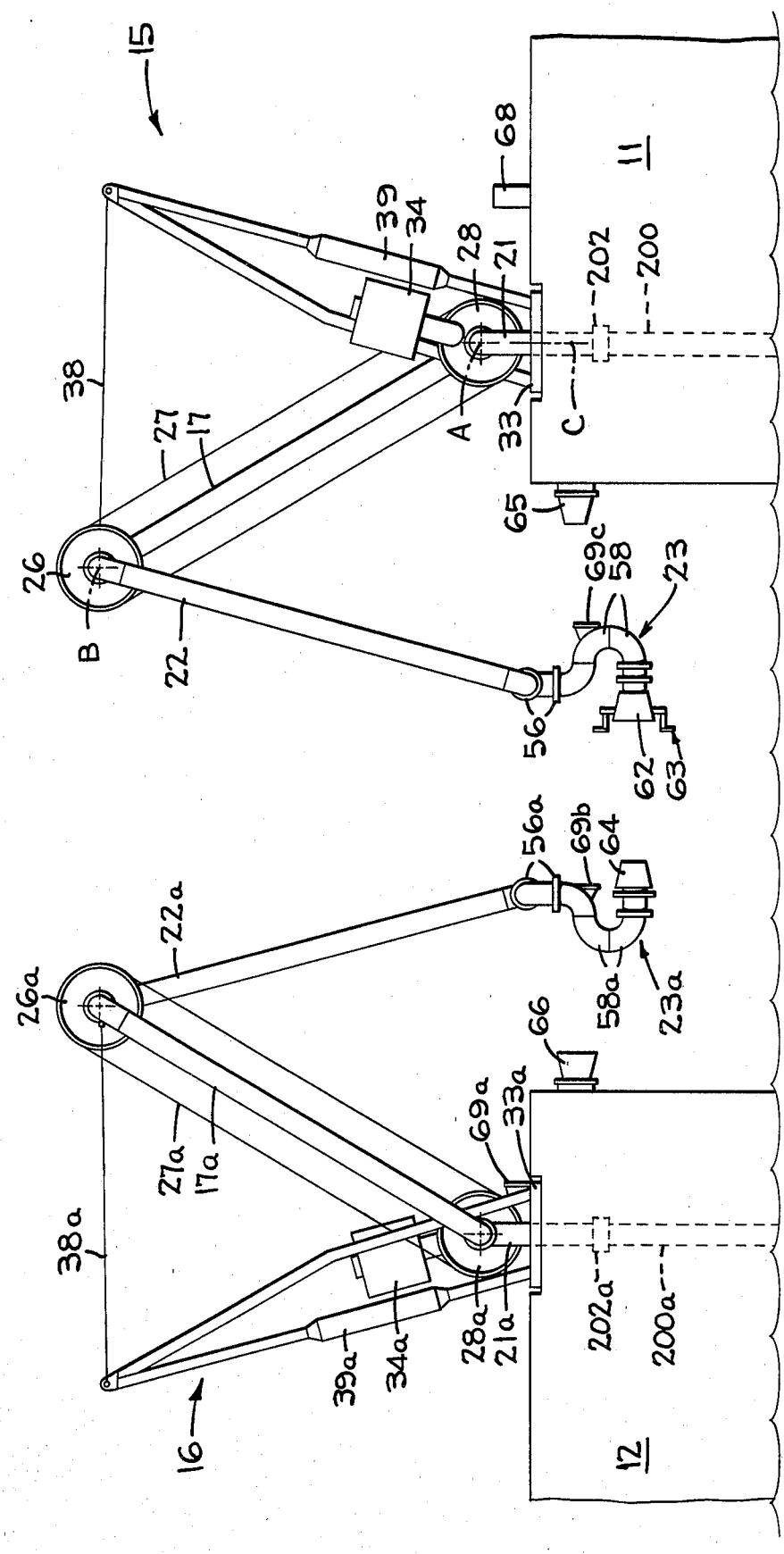

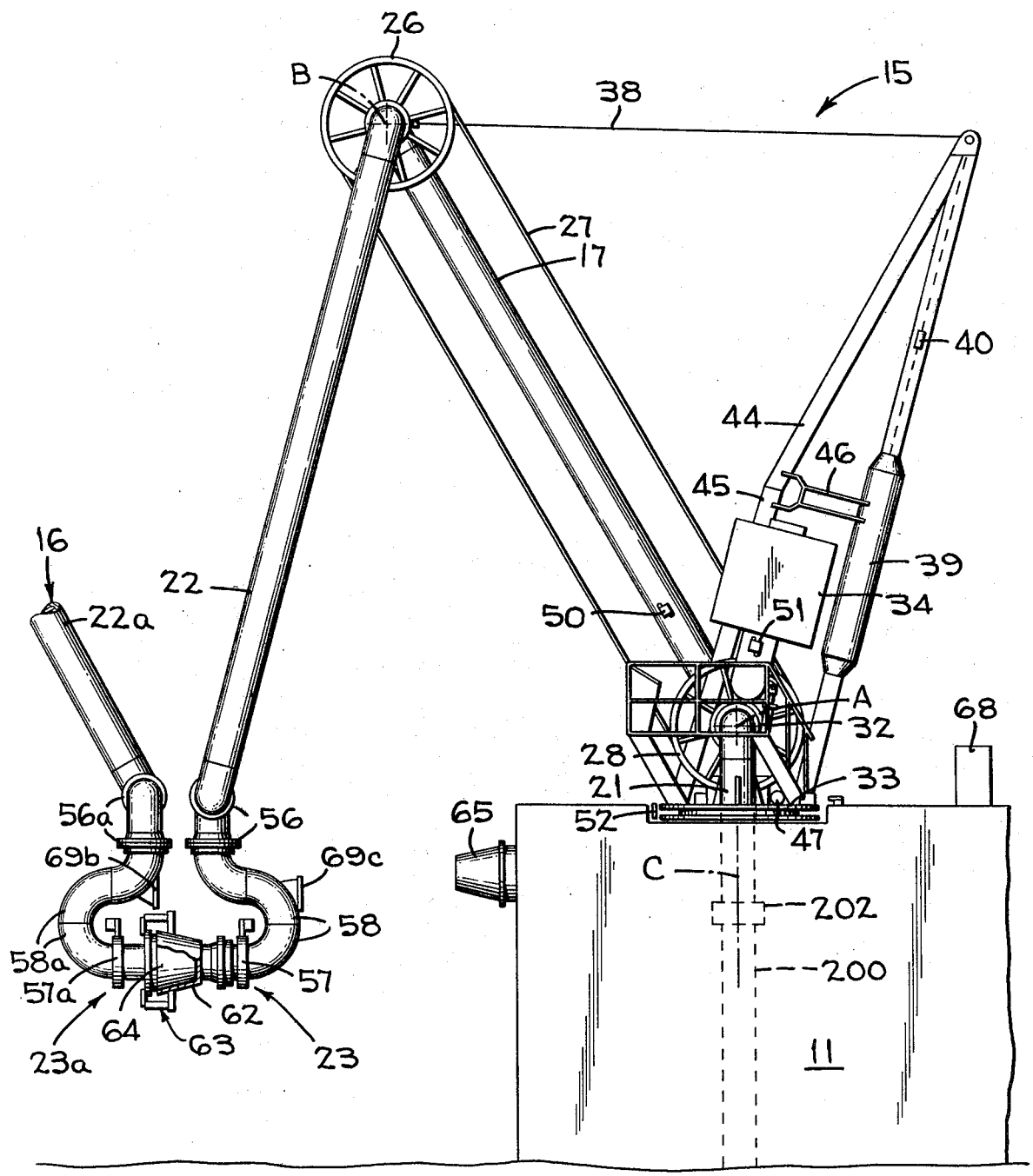

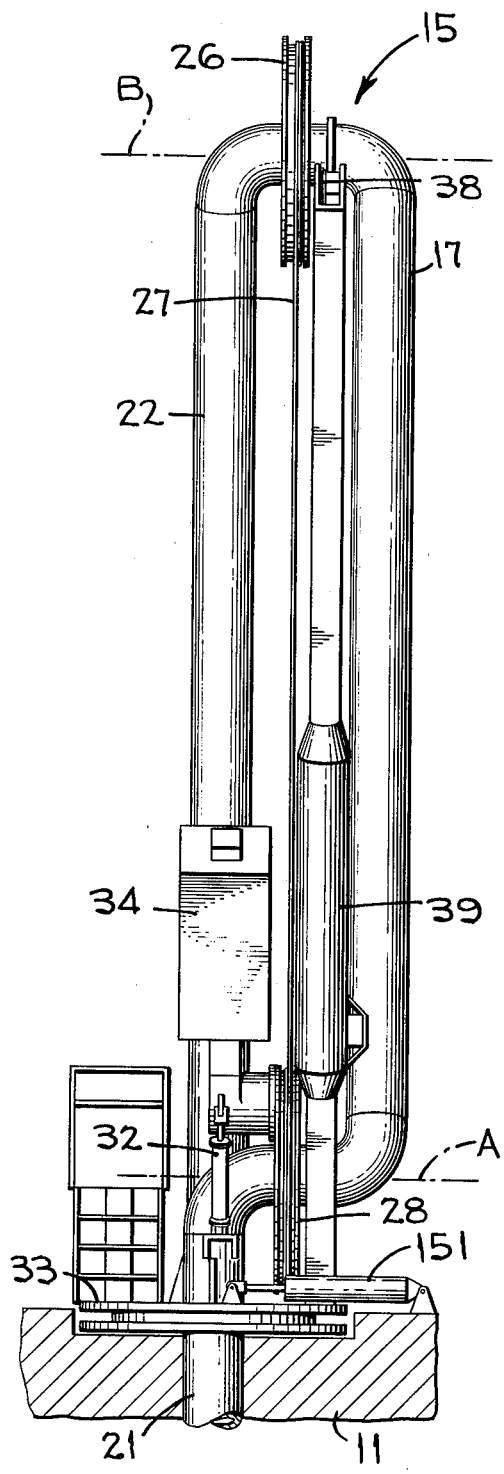
FIG_3
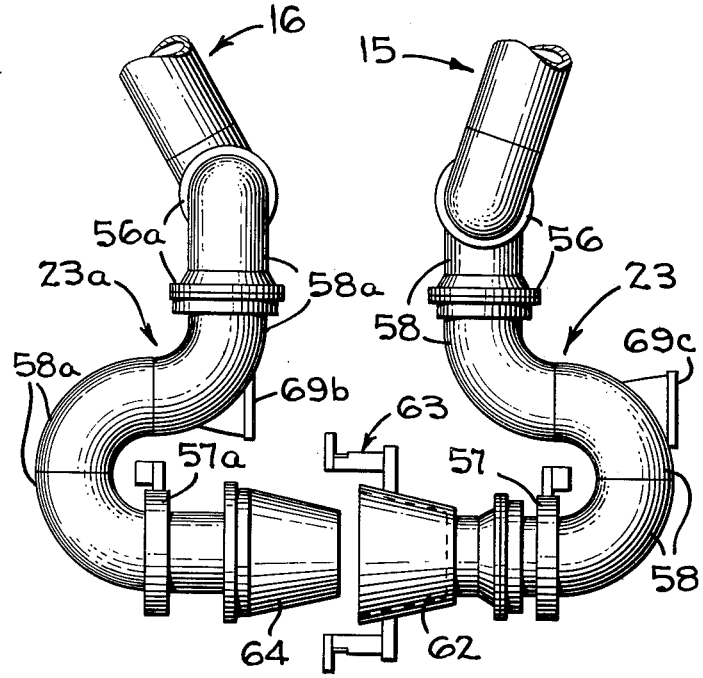
FIG_4
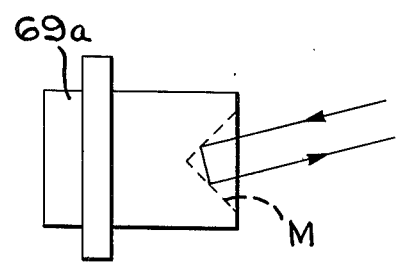
FIG_5

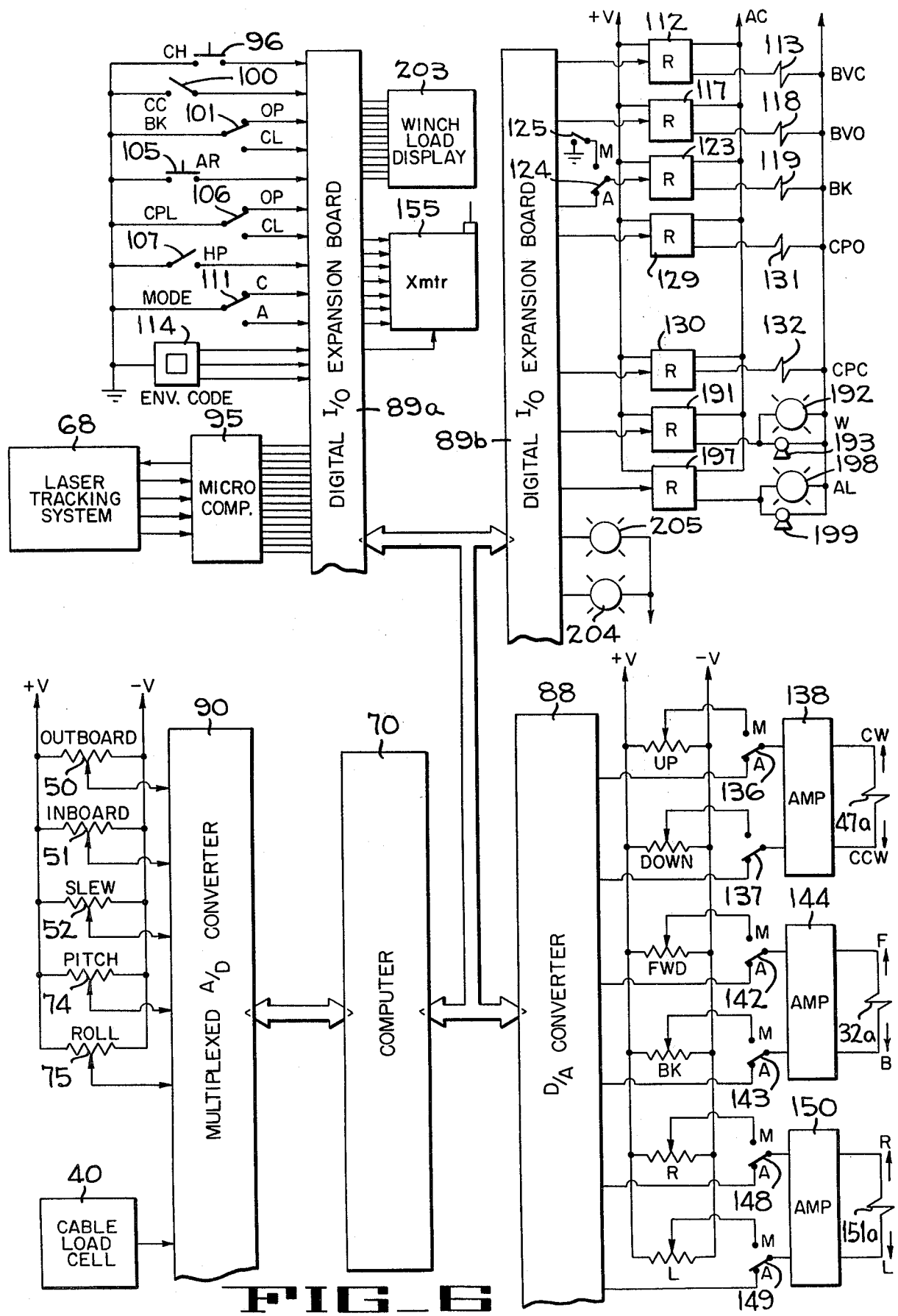
FIG_6

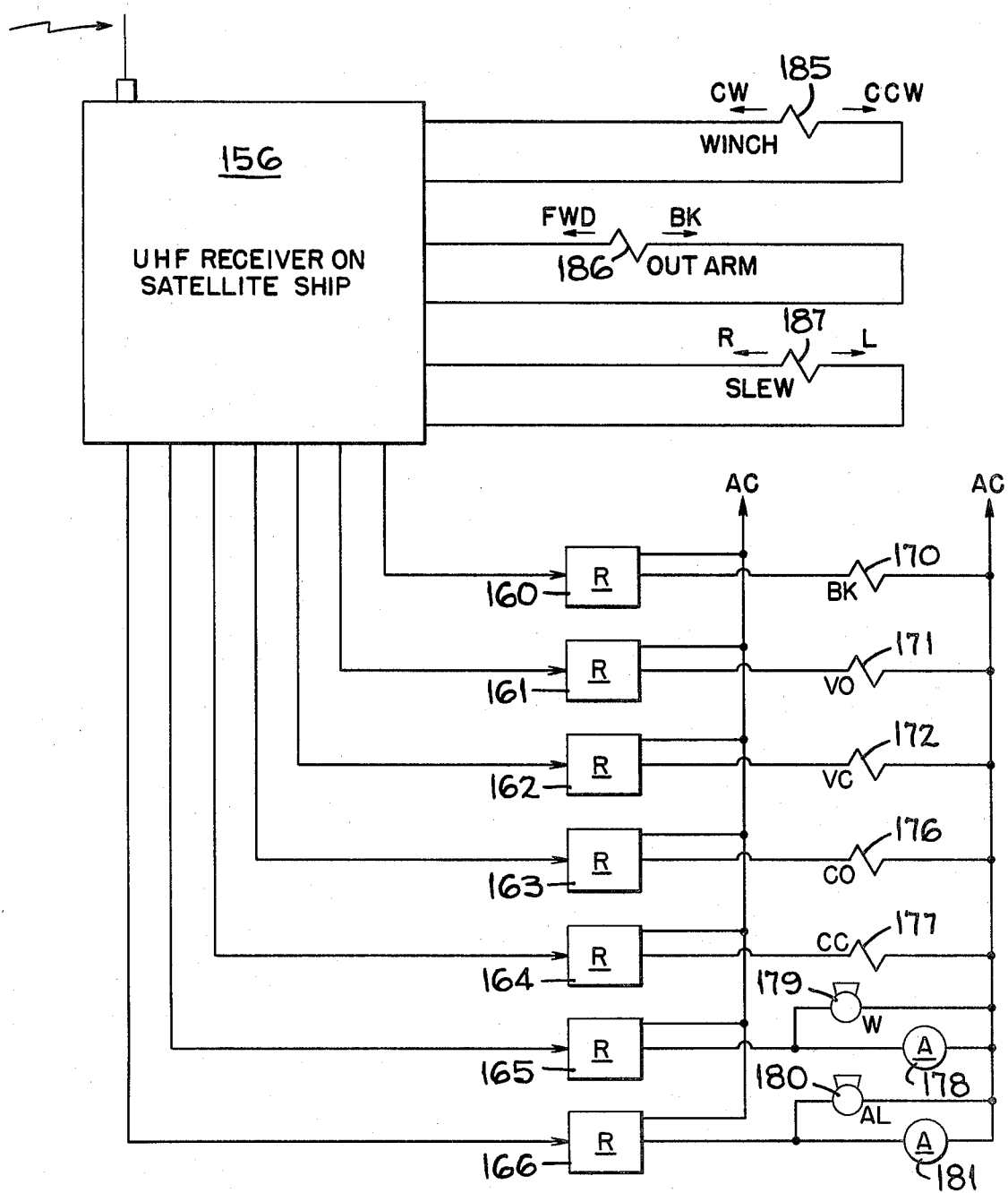
FIG_7

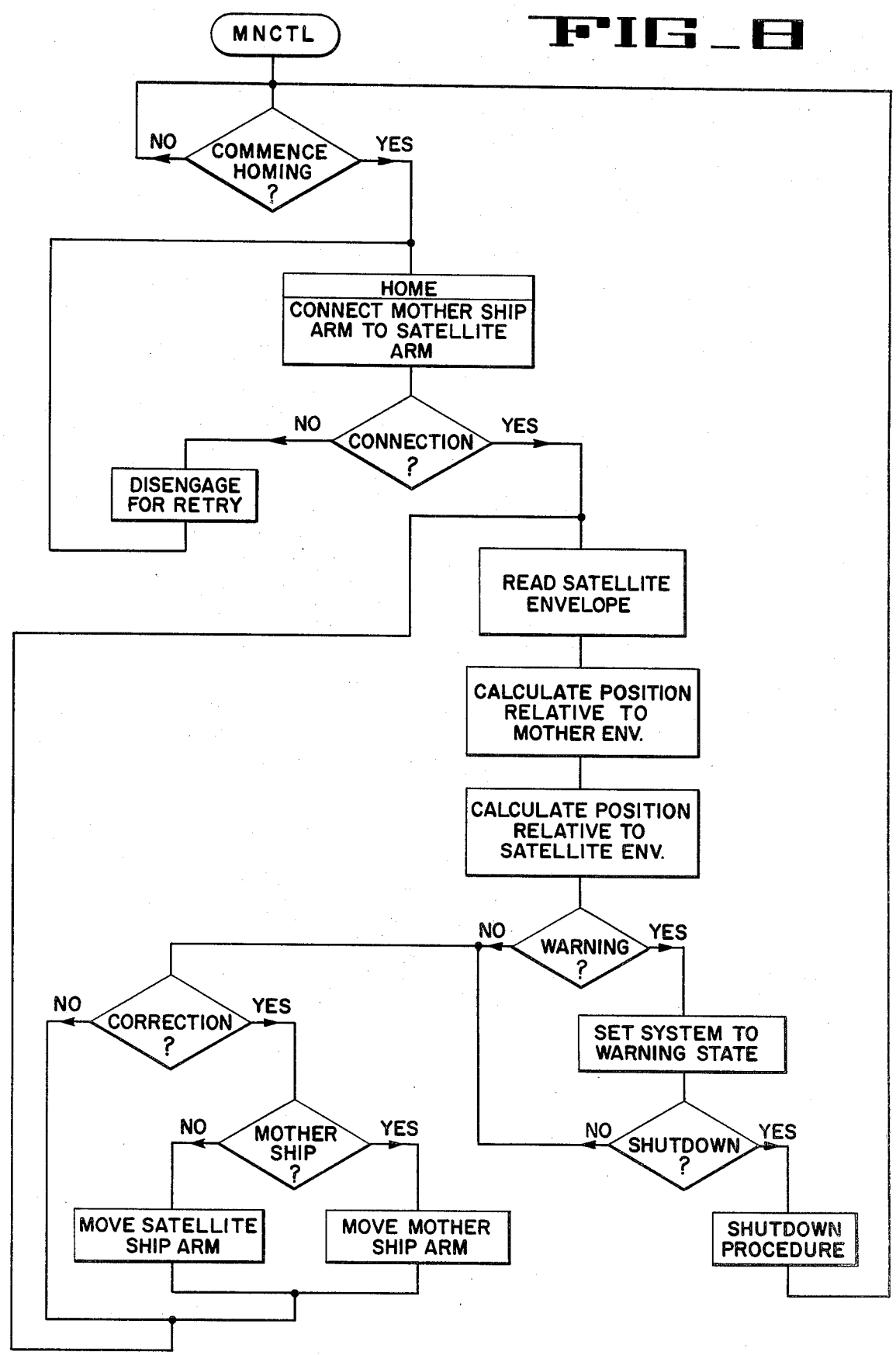
FIG_8

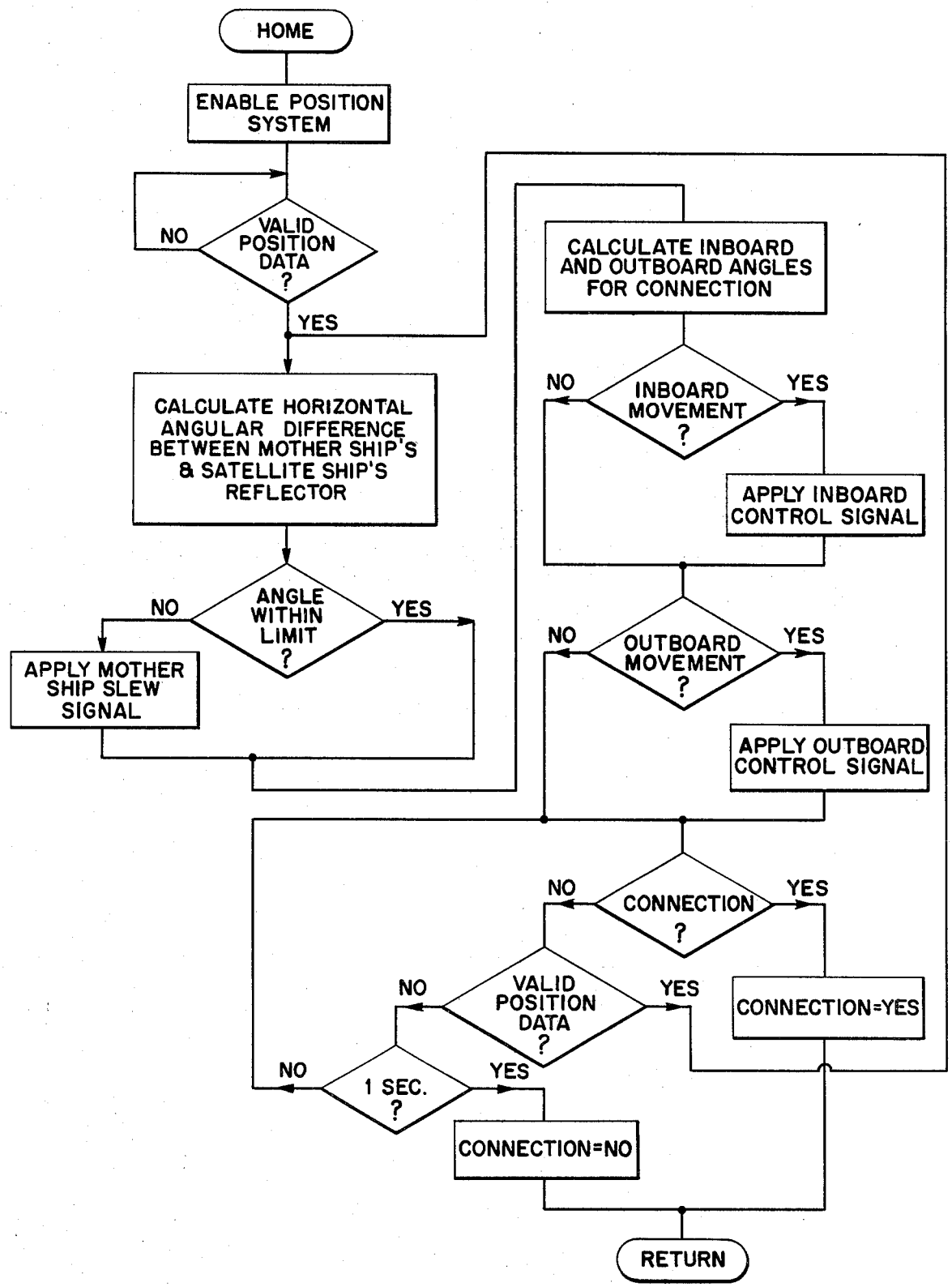

SHIP-TO-SHIP FLUID TRANSFER SYSTEM

BACKGROUND OF THE INVENTION

1. Field of the Invention

This invention relates to articulated fluid transferring apparatus and, more particularly, to a system for transferring fluid between two marine tankers.

2. Description of the Prior Art

The production of oil and gas from offshore wells has developed into a major endeavor of the petroleum industry, and this growth has led to the development of means for transporting petroleum products from offshore wells to shore-based refineries or storage facilities which may be several hundreds or thousands of miles from the loading area. Many of the wells are in deepwater locations where the use of marine tankers of very large capacity constitutes the most practical and efficient method of transporting the petroleum products. Unfortunately, some of the storage and refinery facilities are located near harbors having small or shallow unloading areas where large marine tankers cannot be safely maneuvered.

One solution to this problem is to position the large tankers in deepwater some distance from the smaller or shallow harbors, and then transfer the petroleum products to tankers of smaller draft and/or size that permits their safe use in such limited harbors. However, during the fluid transfer operation the large and small tankers move relative to each other due to winds, tides, and currents, and also in response to a change in the amount of fluid in each of the tankers, and draft of each tanker changes as it is being loaded or unloaded, thus requiring the use of an articulated or other flexible fluid transfer conduit between the two tankers. When flexible hoses are used a tender is normally required to assist in positioning the hoses for connection to a tanker manifold. Not only is the use of tenders costly, time consuming, and otherwise undesirable, but movement of the tankers may cause the flexible hose to rupture. Also, such hoses are bulky, heavy, and otherwise hard to handle, and require a relatively large crew of workers to make up their connections to the tankers.

Another solution to the ship-to-ship fluid transfer problem is to mount an articulated loading arm on the larger tanker and connect this loading arm to either a manifold or a second articulated loading arm located on the smaller tanker. Articulated fluid loading arms generally comprise an inboard limb pivotally supported on a vertical riser pipe to facilitate movement of the arm about horizontal and vertical axes, an outboard limb connected by a pipe swivel joint to the inboard limb for pivotal movement relative thereto about another horizontal axis, and a coupler or other device at the outer end of the outboard limb for releasably connecting the arm to a tanker manifold or a second articulated arm. Because of their large size, the inboard and outboard limbs are individually maneuvered and controlled by hydraulic systems, and the operation of these control systems must be coordinated in order to properly position the outer end of the arm. When a pair of loading arms are each mounted on a separate tanker, and the tankers are in motion due to the action of the sea, etc., the task of aligning and interconnecting the outer ends of the two arms by manual operation of the hydraulic controls is very difficult.

Accordingly, what is needed is an apparatus for sensing the position of each of the outboard ends of the two loading arms relative to a reference position on one of the tankers, means for moving the outboard ends into alignment, and means for coupling the outboard ends together in a fluid-tight connection. This requires sensing the horizontal and vertical angle of the outboard end of each loading arm relative to the reference position, and sensing the distance between the reference position and each of the outboard ends. The position of each outboard end relative to the reference position can be used to calculate the position of one outboard end relative to the other outboard end, and the hydraulic controls operated to bring the two outboard ends together.

If the outboard end of either of the loading arms is extended beyond a safe distance from the mounting base of the arm, or if a loading arm is moved vertically or horizontally outside a three-dimensional space known as the arm's "operating envelope", the weight of oil or other fluid in the arm during use could cause damage to the arm or to a manifold to which the arm is connected. To keep the stress of the arm on the manifold within acceptable limits, the extension of the arm and the slew angle must be limited. It is therefore important that a system be provided for monitoring the actual position of the outboard end of the arm and for sounding an alarm whenever the end of the arm extends outside the specified envelope, or whenever the stress on the arm exceeds a predetermined value.

One solution to the problem of monitoring the actual position of the end of the loading arm is to employ an electronic computer which can use the elevation angle of the inboard and outboard limbs, the arm's slew angle, and the lengths of the inboard and outboard limbs to calculate the actual spatial position of the end of the arm and to compare this position with a set of safe spatial boundaries. The computer develops a warning signal when the end of the loading arm extends outside any of the safe boundaries. One such system is described in Haley U.S. Pat. No. 4,205,308, issued on May 27, 1980.

SUMMARY OF THE INVENTION

The present invention comprises a system for transferring fluid from one marine tanker or mother ship to another marine tanker or satellite ship using automatic controls to position and connect the end of a first marine loading arm mounted on the mother ship to the end of a second arm or to a tanker manifold on the satellite ship. The system includes means for sensing the distance and direction of the outboard end of the second arm relative to the outboard end of the first arm, and means for remotely moving the two arms together into a fluid-tight relationship. If the satellite ship does not have a marine loading arm, the marine loading arm from the mother ship can be moved into position and connected to a tanker manifold on the satellite ship.

The system includes means for sensing the spatial position of the end of each of the loading arms. Also included are means for storing the spatial boundaries of a safe working area for the end of the loading arm of the mother ship, means for comparing the actual position in space of the arm with the safe boundaries, and means for generating an alarm signal when the end of the arm reaches beyond any of the safe boundaries. When the arm continues to move beyond this first set of safe boundaries to a second set of boundaries, a computer generates a shut-down signal which disables the arm. The system monitors the stress on a cable which supports the loading arm and provides alarm and/or shutdown signals when the stress exceeds predetermined values.

BRIEF DESCRIPTION OF THE DRAWINGS

FIG. 1 is a diagrammatic side elevation of a ship-to-ship loading system of the present invention, including a pair of loading arms mounted for transferring fluid from a first marine tanker to a second marine tanker.

FIG. 2 is an enlarged diagrammatic side elevation of a portion of the loading system of FIG. 1, showing details of one of the loading arms connected to an outboard portion of the other loading arm.

FIG. 3 is a rear elevation of a portion of one of the loading arms of FIG. 2.

FIG. 4 is an enlarged side elevation of the outboard portion of the loading arms of FIG. 2.

FIG. 5 is a side elevation of a light reflector of the type mounted on the outboard portion of the loading arms and at the base of one of the loading arms.

FIG. 6 comprises a schematic diagram of a computer circuit which can be used to calculate the various positions of the end of the loading arms and to guide the arms into a working engagement. The circuit also compares these positions with safe boundaries which are stored in the micro-computer memory.

FIG. 7 comprises a schematic diagram of an electronic circuit for controlling the loading arm on a satellite ship.

FIGS. 8 and 9 illustrate flow charts which can be used in understanding the operation of the computer.

DESCRIPTION OF THE PREFERRED EMBODIMENT

Referring to FIGS. 1–5 of the drawings, a ship-to-ship fluid transfer system according to the present invention is shown for use with a large "mother" ship or tanker 11 and a smaller "satellite" ship or tanker 12. The system comprises a pair of articulated loading arms, 15,16 (FIG. 1) each mounted on one of the tankers 11,12 in a suitable position for transferring fluid between them. The loading arms 15,16 are identical in several respects, and the following description of the arm 15 therefore applies to the arm 16 wherein like elements are designated by the same reference numeral plus the suffix "a".

The arm 15 comprises an inboard limb 17 pivotally connected about a horizontal axis A to a riser conduit 21 that is rotatably connected to a fluid supply conduit 200 by a pipe swivel joint 202, an outboard limb 22 pivotally connected about another horizontal axis B to the inboard limb, and a connector assembly 23 (FIGS. 1, 2 and 4), such as a pipe flange or coupler, at the outer end of the outboard limb 22 for connecting the outer end of the arm to a tanker manifold or the outer end of another arm. An outboard sheave 26 is fixed to the inboard end of the limb 22 and is mounted for rotational movement about the horizontal axis B at the outboard end of the limb 17. An endless cable 27 is trained around the sheave 26 and an inboard sheave 28 that is mounted for rotational movement about the horizontal axis A at the upper end of the riser 21. The inboard sheave 28 can be rotated about the horizontal axis A by a hydraulic ram 32 (FIGS. 2 and 3) that is connected between the sheave 28 and a support platform 33. A counterweight 34 connected to the inboard sheave 28 neutralizes or greatly reduces the tendency of the outboard limb 22 to turn about the horizontal axis B regardless of the attitude of the limbs 17,22.

The entire arm assembly is mounted on the platform 33, and this platform is pivotally supported on the tanker 11 so that the arm and the platform can be rotated about a vertical axis C through the riser 21. A cable 38 is fixed to the upper end of the inboard limb 17 and is connected to a running line tensioner 39 for pivotal movement of the inboard limb 17 about the horizontal axis A. One tensioner which can be used with the present invention is the 50,000 lb. riser tensioner Model LX-REU-CW-12 manufactured by the Shaffer Division of NL Rig Equipment Inc., Houston, Tex. The cable 38 is connected to a strain gauge 40 (FIG. 2) that provides an output signal which is proportional to the strain in the cable 38. This strain gauge can be used to provide a warning signal when the strain in the cable 38 increases above a predetermined safe level. The line tensioner 39 is secured to the support platform 33 by a plurality of interconnected frame members 44–46, and a winch 47 (FIG. 2), connected to the line tensioner 39, provides power for raising and lowering the outer end of the inboard limb 17.

A pair of angle transducers 50,51 (FIG. 2) are coupled to the inboard and outboard limbs 17,22, respectively, to provide signals which indicate the horizontal orientations of the limbs. Since the counterweight 34 is positioned in a parallel relation to the attitude of the outboard limb 22, the transducer 51 is mounted on the counterweight it will provide elevation angle readings identical to the reading obtained from a transducer mounted on that limb. One such transducer which can be used to provide a signal which is representative of the angular position of the inboard and outboard limbs is the precision pendulum Model CP17-B601-1 manufactured by Humphrey., Inc., San Diego, Calif. The slew angle, i.e., the azimuthal position of the arm with respect to the vertical axis C, is obtained by a potentiometer or angle encoder 52 (FIG. 2) which is connected between the tanker 11 and the support platform 33.

The connector assembly 23 (FIGS. 2 and 4) includes a plurality of pipe swivel joints 56 and a cut-off valve 57 interconnected by a plurality of pipe elbows 58. The outer end of the connector assembly 23 includes a truncated funnel-shaped female coupler 62 and a clamping assembly 63 for releasably connecting the coupler 62 to a male coupler 64 at the outer end of the connector assembly 23a. The coupler 62 can be connected to another male coupler 65 suitably positioned on the tanker 11 to drain the fluid from the arm 15 when the satellite arm 16 is disconnected therefrom and the male coupler 64 can be connected to another female coupler 66 suitably positioned on the tanker 12 to drain the fluid from the arm 16.

A laser based tracking and ranging system 68 (FIG. 2) provides a laser beam which is projected in a scanning pattern toward a plurality of corner reflectors 69a-69c (FIGS. 1, 2 and 4) to determine the location of the connector assemblies 23,23a and the base of the satellite loading arm 16 relative to the laser tracking system 68. Laser beams which are returned to the system 68 from the corner reflectors provide signals which can be used by a shipboard computer to move the connector assemblies 23,23a into a fluid-tight connection to effect safe transfer of fluid from the tanker 11 to the tanker 12. The reflectors 69a-69c each include a corner mirror M (FIG. 5) which causes the reflected light to be directed in a path parallel to the incident light. Corner reflectors of this type are commonly used in a variety of industrial applications.

The analog signals which are obtained from the angle transducers 50-52 (FIG. 2) are converted to digital signals by a multiplexed analog-to-digital converter 90 (FIG. 6) and used by a computer 70 to compute the exact spatial position of the connector assemblies 23,23a relative to the tankers 11,12. The safe boundaries of these connector assemblies are stored in the computer memory, and these boundaries are continually compared with the actual position of these assemblies. When the actual position of either of the connector assemblies 23,23a reaches any of the boundaries of the safe area, the computer provides a warning signal to an alarm device. If the connector assembly continues to move away from the safe area, the computer provides a shutdown signal which provides a warning signal to the operators on both tankers so that fuel pumps can be turned off, the proper valves can be closed, and the connector assemblies 23,23a disconnected. If desired, the shutdown signal can be used to turn off the pumps and disable the arms.

The number of steps in the shutdown procedure and the action to be taken in each of these steps may vary to the wishes and requirements of those who are using the loading arms. In some cases, the shutdown procedure provided by the present invention may consist of only providing a shutdown signal to the operating personnel, while in other cases a more elaborate procedure is required. In any case, the computer can be programmed to provide a desired signal or sequence of signals. Details of the computer circuits which perform these operations are described in detail below.

FIG. 6 is a block diagram representing the basic circuitry of the programmable ship-to-ship fluid transfer system of the present invention. A main computer 70 includes a program memory (not shown) which stores the length of each of the limbs 17,17a, 22,22a, the coordinates of all the safe boundaries for the connector assemblies 23, 23a, and a program to be executed by the processor of the computer. The angle sensors 50-52, and two additional sensors 74,75 (FIG. 6) provide elevation, slew, pitch, and roll information through the analog-to-digital or A/D converter 90 to the computer 70 which stores this information in a data memory. One A/D converter which can be used is the ISBC 711, built by the Intel Corporation. One sensor which may be used to provide pitch and roll informtion is the Model CP17-0601-1 made by Humphrey, Inc., San Diego, Calif. The computer 70 (FIG. 6) includes a small scratch pad memory which can be used to temporarily store data to be processed, an accumulator which performs the operation of manipulating data, and a program counter which stores the address of the step of the computer program that is to be executed. One computer which may be used in the circuit of the present invention is the SBC80/30 single board computer, built by the Intel Corporation, Santa Clara, Calif. Details of the SBC80/30 computer may be found in the "Systems Data Catalog", 1978, by Intel Corporation.

In order for the computer 70 (FIG. 6) to communicate with a number of output devices, such as tensioners, slewing devices, alarms and shutdown devices, and to individually control these devices, a digital-to-analog (D/A) converter 88 is connected between these devices and the computer 70. The computer 70 provides control signals to the devices and channel-select signals to the amplifiers 138,144,150 through the D/A converter 88.

The channel-select signals determine which of the amplifiers 138,144,150 receive control signals from the computer 70 through the converter 88. The control signals are amplified by amplifiers 138,144,150 and used to control the operation of winch 47, ram 32 and ram 151. One such set of D/A converters which may be used in the present circuitry is a pair of ISBC 724 boards built by the Intel Corporation.

The laser tracking system 68 includes a laser based distance meter such as in Model 3850 distance meter built by Hewlett Packard, Inc., Loveland, Colo., and a laser tracking system built by Aeroflex Laboratories, Inc., Long Island, N.Y. The control of the tracking system is provided by a micro-computer 95 which causes the tracking system to provide a scan raster until the reflectors 69a-69c (FIG. 1) are located by reflected signals and then causes the system to lock on to these reflectors and to track them. When the micro-computer 95 receives a "commence scan" signal from the main computer 70, the micro-computer generates scan signals which causes the laser tracking system 68 to scan a raster consisting of approximately 20 elevation steps and 20 azimuth scans at a rate which covers the entire field of ±45 degrees azimuth in a period of two minutes. When a target is sensed, signals representing the target azimuth and elevation coordinates are continuously coupled to the microcomputer 95. When all of the available targets 69a-69c have been sensed, the laser distance meter is successively switched to the targets, and signals representing the range of each of the targets is sent to the micro-computer 95. If a target which was previously sensed is lost, the target acquire signal is removed from the computer and the target number is indicated. The micro-computer 95 can issue position commands to generate a limited raster scan around the last known coordinate of the reflector which was lost and the lost target can be relocated by the scanning system. Signals representing the range and position of the target 69a-69c are coupled from the micro-computer 95 through expansion boards 89a,89b to the main computer 70. A suitable micro-computer 95 for the element is the Intel Model 8085 built by the Intel Corporation, Santa Clara, Calf. An expansion board which can be used is the ISBC 519 also built by the Intel Corporation.

Other input control signals are provided by the "commence homing" switch 96, the "coupler to coupler" switch 100, the "ball valve open or closed" switch 101, the "alarm reset" switch 105, the "coupler open or closed" switch 106, the "hydraulic pressure" switch 107 and the "mode control" switch 111 which places the system either in the control or in the alarm mode. Envelope code signals are also provided from the satellite ship to the input of the main computer 70. These envelope code signals can be transmitted from the satellite ship to the mother ship and received by a receiver 114, or an operator on the mother ship can load the safe boundaries of the satellite ship arm directly into the main computer 70.

Some of the input signals which are received by the main computer 70 cause the computer to develop output signals which directly open or close valves or perform other control functions, while other input signals are compared with boundary signals stored in the computer memory and an appropriate action is taken by the computer. When it is desired that the ball valve 57 (FIG. 4) be closed, the computer 70 (FIG. 6) provides an output signal to a solid state relay 112 which energizes a valve solenoid 113. An output signal from the computer 70 to a solid state relay 117 causes a valve opening solenoid 118 to be energized. A winch brake solenoid 119 can be energized by a signal from the computer 70 to a solid state relay 123 when a mode switch 124 is in an automatic "A" position, or the solenoid 119 can be energized by closing a manual switch 125 when the mode switch 124 is in a manual "M" position. The clamping device 63 (FIG. 4) can be opened or closed by an output signal (FIG. 6) from the computer 70 which causes the solid state relays 129,130 to energize either a "coupler open" solenoid 131 or a "coupler closed" solenoid 132.

The operation of the computer circuit will now be described in connection with the apparatus fo FIG. 1, the circuit of FIG. 6 and flow charts of FIGS. 8–10. To interconnect the loading arms 15,16 (FIG. 1) the arm 16 of the satellite ship 12 is positioned approximately midway between that ship and the mother ship 11 by hydraulic valves which are operated by the usual manual controls mounted on the satellite ship 12. When powder is initially applied to the computer circuit of FIG. 6, a computer program stored in memory of the main computer 70 causes the main computer to send a signal to the micro-computer 95 which initiates the scanning procedures illustrated in the flow charts of FIG. 8. Upon receipt of a "commence scan" command from the main computer, the micro-computer 95 directs the laser tracking system 68 (FIG. 2) to search for the reflector 69b at the outer end of the satellite loading arm 16 while inhibiting a scanning of the mother ship loading arm 15. The laser tracking system scans a laser beam over a field of ±45 degrees azimuth and over a 60 degree vertical field in a series of 20 elevation steps and 20 azimuth steps until the reflector 69b is located. Once the reflector 69b is located by the tracking system 68, the distance of the reflector 69b is measured and the coordinates of the reflector's location are stored in the memory of the main computer 70. The reflector 69a on the satellite ship is similarly located and its location is stored in the computer memory.

Once the reflectors 69a,69b have been located by the laser tracking system the homing operation of FIG. 9 is implemented. The main computer 70 (FIG. 6) uses the input signals from the laser tracking system 68, from the pitch sensor 74 and the roll sensor 75 to develop a series of control signals which are coupled through the D/A converter 88 to the amplifiers 138,144,150. Signals from the D/A converter 88 are coupled through a pair of switches 136,137 to a hydraulic servo amplifier 138 which operates a servo valve 47a of the winch 47 (FIGS. 2 and 6) to raise and lower the inboard limb 17 of the mother ship loading arm 15. Signals from the D/A converter 88 are coupled through a pair of switches 142,143 to a hydraulic servo amplifier 144 which operates a servo valve 32a which controls the hydraulic ram 32 to raise and lower the outboard limb 22, and other signals are coupled through a pair of switches 148,149 and a servo amplifier 150 to a servo valve 151a for a hydraulic ram 151 which slews the loading arm 15 to the right and left. Servo valves 32a,4-7a,151a which can be used in the present invention are the Series 78 servo valves manufactured by the Moog, Inc., East Aurora, N.Y. Servo amplifier 138,144,150 which can be used are the Model 121—103 by Moog, Inc. Flow charts illustrating the computer program for implementing the homing operation are shown in FIGS. 8 and 9. The switches 136,137,142, 143,148,149 can be moved upward into a manual "M" position when manual operation of the loading arm 15 is desired.

During the homing operation, the laser tracking system is constantly scanning the reflectors on the loading arm 16 (FIG. 1) of the satellite ship, and the computer 70 (FIG. 6) is updating the coordinates of the reflectors 69a,69b which are constantly changing due to the relative motion of the satellite ship. As the mother ship's loading arm 15 is moved toward the satellite ship's loading arm 16, the reflector 69c on the mother ship's loading arm also moves into the scanning area of the laser system. The computer used the coordinates of the reflectors 69c,69b to calculate the final fine adjustment of the positions of the couplers 62,64 (FIGS. 1 and 4) to move the couplers into engagement and to activate the coupler close solenoid 132 (FIG. 6). This technique eliminates both the inherent error between the two tracking systems and the absolute error of the laser system since this final adjustment utilizes a relative measurement between the two reflectors 69b,69c.

When the couplers 62,64 (FIGS. 1 and 4) have been properly mated, the proximity type coupler-to-coupler switch 100 (FIG. 6) on the mother ship is closed, thereby signalling the computer that the coupler solenoid 132 can be activated to lock the couplers 62,64 in a fluid-tight connection. The valves 57,57a can be opened and fluid transferred between the mother and the satellite ships. At this time, power is removed from the outboard limbs 22,22a and the loading arms allowed to "float" to accommodate relative motion between the mother and satellite ships without undue stress on the arms.

After the loading arms 15,16 are connected together, the mother ship's computer 70 monitors the position of the outer end of the arms and compares these positions with the boundaries of the safe operating envelopes which are stored in the computer memory. The safe boundaries of the mother ship's arm 15 are conveniently stored in a computer memory as these boundaries do not vary; however, boundaries of the satellite ship's arms may present another problem as several types of satellite ships and several types of loading arms may be used with the mother ship. Thus, several satellite boundary patterns must be stored in the memory of the main computer 70 and the correct satellite envelope selected in one of two ways:

(1) The type of satellite arm and its envelope number can be marked on the satellite ship arm and this arm type communicated to the mother ship by a radio voice channel. A selector switch on a computer control panel can be manually moved to select the correct satellite envelope.

(2) A unique code can be incorporated into the satellite ships's coupler at the time of manufacture and this code detected by proximity switches on the mother ship's coupler when the arms are connected together. This code automatically selects the satellite ship's operating envelope to be utilized by the main computer 70. These proximity switches can also be used to signal engagement of the coupler clamp during the mating operation.

The laser system 68 continually checks the position of the loading arms 15,16 and compares the position with the safe operating boundaries. The mother ship's angle transducers 50–52 also provide backup information to the primary scanning system.

When either of the loading arms 15,16 (FIG. 1) approaches the corresponding safe operating boundaries, the main computer 70 (FIG. 6) provides correction signals which move the outer end of the appropriate arm away from the boundary. When the mother ship's arm 15 approaches the safe boundary the computer 70 sends the appropriate correction signals through the D/A converter 88 (FIG. 6) to the ram 32, the winch 47 and/or the ram 151 to move the arm away from the boundaries toward the center of the safe area. When the satellite ship's loading arm 16 (FIG. 1) approaches the safe boundary, the computer 70 provides control signals which are transmitted by a radio transmitter 155 (FIG. 6) on the mother ship 11 to a radio receiver 156 (FIG. 7) on the satellite ship 12 to move the satellite ship's loading arm toward the safe area. A radio transmitter which can be used in the present invention is the Model 125-104 and the radio receiver which can be used is the Model 127-123, both manufactured by Moog, Inc.

The radio receiver 156 (FIG. 7) on the satellite ship provides control signals which operate the valve 57a (FIG. 4) on the outer end of the satellite loading arm 16 and positions the loading arm through the slew and elevation controls. A plurality of solid state relays 160-166 use the control signals to selectively switch electrical power to a winch brake 170, a valve open solenoid 171, a valve close solenoid 172, coupler open and close solenoids 176,177, a warning light 178, a warning horn 179, an alarm horn 180 and an alarm light 181. The receiver 156 also provides control signals to a solenoid 185 which operates the satellite tensioner, a solenoid 186 which causes the outboard limb 22a (FIG. 1) to raise and lower, and a solenoid 187 which operates a slewing ram (not shown).

When the mother ship and the satellite ship drift into a position where the outer end of the loading arm 15 approaches the outer edge of a safe boundary and the computer 70 is not able to correct the relative position of the two loading arms, a warning signal is transmitted from the computer to a solid state relay 191 (FIG. 6) which energizes a warning light 192 and a warning horn 193. If the arms continue to move outside the safe boundary a danger signal is transmitted from the computer to a solid state relay 197 which energizes an alarm light 198 and an alarm horn 199 and the computer initiates an automatic disconnect operation. The computer 70 provides a signal which energizes the coupler open solenoid 131 to uncouple the loading arms 15,16 from each other and move them back to their respective ships 11,12. The dual warning and alarm system also provides a warning signal when the load cell 40 (FIG. 6) indicates the tension on the cable 38 (FIG. 2) is reaching an unacceptable upper limit. When the tension on the cable 38 exceeds this limit the alarm is sounded and the loading arms are disconnected. The computer provides a signal which causes a winch load display unit 203 to provide a continuous reading of the load on the load cell 40. A signal is provided to a warning lamp 204 (FIG. 6) when a malfunction occurs in the computer, and another signal is provided to a lamp 205 when a malfunction occurs in the cable load cell 40.

The present invention discloses a system for connecting a loading arm on a first tanker with a loading arm on a second tanker and for monitoring the outboard end of each arm relative to a set of safe operating boundaries. A laser tracking system senses the position of the outboard end of each of the loading arms and sends this information to a computer which provides signals that cause the arms to move together into a fluid transfer connection. Whenever either arm moves outside its safe boundary a warning signal is provided and the computer provides signals to move the arm inside its safe boundary. If either arm moves outside a critical boundary an alarm signal is provided and the two arms are disconnected.

Although the best mode contemplated for carrying out the present invention has been herein shown and described, it will be apparent that modification and variation may be made without departing from what is regarded to be the subject matter of the invention.

What is claimed is:

1. A ship-to-ship fluid transfer system having remote control means for connecting a loading arm on one ship with a storage facility on another ship, said system comprising:
   an articulated loading arm;
   means for mounting said loading arm on a first ship;
   a receiving means;
   means for connecting said receiving means to said storage facility on a second ship;
   means for sensing the distance and the direction of said receiving means relative to an outboard end of said loading arm and for developing signals proportional to said distance and to said direction;
   means for using said signals from said sensing means to move said outboard end of said loading arm into operating engagement with said receiving means;
   means for storing a set of parameters of a safe operating boundary for said loading arm; and
   means for disconnecting said loading arm from said receiving means when said loading arm moves outside said safe boundary.

2. A ship-to-ship transfer system as defined in claim 1 including means for clamping said receiving means to said outboard end of said loading arm.

3. A ship-to-ship transfer system as defined in claim 1 wherein said sensing means includes a pair of optical reflectors, means for mounting a first reflector on said receiving means, means for mounting a second reflector on an outboard portion of said loading arm, and a laser tracking and ranging system for locating said first and second reflectors and developing signals proportional to the distance and direction of each of said reflectors from a fixed location on said first ship.

4. A ship-to-ship transfer system as defined in claim 3 wherein said means for using signals includes a computing means for receiving said distance and said direction signals and for developing control signals in response to said distance and said direction signals, and arm positioning means for moving an outboard end of said loading arm into operating contact with said receiving means in response to said control signals.

5. A ship-to-ship fluid transfer system as defined in claim 1 including means for sensing the position of the outboard end of said loading arm relative to the inboard end of said arm; means for comparing the position of said outboard end of said arm with the boundaries of a safe operating zone for said outboard end; and means for providing an alarm signal when said outboard end reaches the limit of said safe zone.

6. A ship-to-ship fluid transfer system having means for connecting a first articulated loading arm mounted on a first ship, to a second articulated loading arm mounted on a second ship, said system comprising:
   means for sensing the position of an outboard end of said first loading arm relative to a predetermined location on said first ship;

means for sensing the position of an outboard end of said second loading arm relative to said predetermined location;

means for calculating the relative positions of the outboard ends of said first and said second loading arms;

means for moving one of said outboard ends of said arms into fluid-transferring contact with the other one of said outboard ends;

means for clamping the outboard ends of said first and said second loading arms into a fluid-tight connection;

means for storing a set of parameters of a safe operating boundary for each of said loading arms;

means for comparing the position of said outboard end of each of said loading arms with a corresponding one of said safe boundaries;

means for providing a warning signal when either of said loading arms reaches a limit of its safe boundary;

and means for disconnecting said first and said second loading arms when at least one of said loading arms moves outside its corresponding safe boundary.

7. A ship-to-ship fluid transfer system as defined in claim 6 wherein each of said sensing means includes an electronic distance meter mounted on said first ship and a reflective target mounted on an end of a corresponding one of the loading arms.

8. A ship-to-ship transfer system as defined in claim 6 including means for moving said loading arms inside said safe boundaries when said comparing means detects that a loading arm moves near the limit of said safe boundary.

9. A ship-to-ship transfer system as defined in claim 6 wherein each of said sensing means includes a reflective target mounted on an end of a corresponding one of said loading arms, means for determining the distance from a first ship to each of said reflective targets, and means for determining the direction of each of said reflective targets.

10. A ship-to-ship transfer system as defined in claim 6 including means for storing the parameters of a safe operating boundary for each of said loading arms, means for comparing the position of said outboard end of each of said loading arms with its safe boundary, and means for moving said outboard end of either loading arm toward a safe area when said outboard end approaches an outer edge of its safe boundary.

* * * * *